United States Patent
Hoffend, Jr.

(10) Patent No.: US 10,422,497 B2
(45) Date of Patent: Sep. 24, 2019

(54) OPTICAL STRUCTURES FOR REDIRECTING DAYLIGHT

(71) Applicant: 3M INNOVATIVE PROPERTIES COMPANY, St. Paul, MN (US)

(72) Inventor: Thomas R. Hoffend, Jr., Pleasanton, CA (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/521,389

(22) PCT Filed: Jun. 18, 2015

(86) PCT No.: PCT/US2015/036395
§ 371 (c)(1),
(2) Date: Apr. 24, 2017

(87) PCT Pub. No.: WO2016/099600
PCT Pub. Date: Jun. 23, 2016

(65) Prior Publication Data
US 2017/0307788 A1    Oct. 26, 2017

Related U.S. Application Data

(60) Provisional application No. 62/094,626, filed on Dec. 19, 2014.

(51) Int. Cl.
*F21S 11/00* (2006.01)
*G02B 5/02* (2006.01)
(Continued)

(52) U.S. Cl.
CPC ............ *F21S 11/007* (2013.01); *G02B 5/021* (2013.01); *G02B 5/122* (2013.01); *G02B 5/126* (2013.01)

(58) Field of Classification Search
CPC ............................... F21S 11/007; G02B 5/021
(Continued)

(56) References Cited

U.S. PATENT DOCUMENTS 5,771,328 A * 6/1998 Wortman ............... F21V 5/02
349/62
6,256,153 B1    7/2001 Suzui
(Continued)

FOREIGN PATENT DOCUMENTS

JP    2008277025    11/2008
JP    2011-027788    2/2011
(Continued)

OTHER PUBLICATIONS

Ingber, "Simulated Annealing: Practice Versus Theory," Mathematical and Computer Modelling, 1993, vol. 18, No. 11, pp. 29-57.
(Continued)

*Primary Examiner* — Christopher E Mahoney
(74) *Attorney, Agent, or Firm* — Jeffrey M. Olofson

(57) ABSTRACT

Window glass having sun-facing daylight redirecting optical structures with an embedded surface diffuser patterned on them. The optical structures are generally linear and formed from a repeating unit cell. Each unit cell has a base, two or more peaks opposite the base, and at least one curved side between the base and the peaks. The other sides between the base and the peaks can be substantially straight, curved, or a series of facets approximating a curve.

12 Claims, 16 Drawing Sheets

(51) Int. Cl.
*G02B 5/122* (2006.01)
*G02B 5/126* (2006.01)

(58) Field of Classification Search
USPC .......................................................... 359/592
See application file for complete search history.

(56) References Cited

U.S. PATENT DOCUMENTS

| | | |
|---|---|---|
| 8,619,363 B1 | 12/2013 | Coleman |
| 9,708,847 B2* | 7/2017 | Kashiwagi ................ E06B 9/24 |
| 9,810,818 B2* | 11/2017 | Wang ..................... G02B 6/0053 |
| 9,857,041 B2* | 1/2018 | Ueki ........................ F21S 11/007 |
| 2004/0246599 A1 | 12/2004 | Nilsen |
| 2006/0226583 A1* | 10/2006 | Marushin ............. G02B 5/0221 |
| | | 264/553 |
| 2007/0206913 A1* | 9/2007 | Lin ........................... G02B 5/04 |
| | | 385/146 |
| 2007/0279934 A1* | 12/2007 | Kim ........................... F21V 7/22 |
| | | 362/607 |
| 2010/0302654 A1* | 12/2010 | Amano ..................... G02B 3/08 |
| | | 359/742 |
| 2011/0043919 A1* | 2/2011 | Ko ............................. E06B 9/24 |
| | | 359/592 |
| 2013/0201660 A1 | 8/2013 | Barbier |
| 2013/0216784 A1* | 8/2013 | Zhang ..................... B08B 17/06 |
| | | 428/147 |
| 2014/0055859 A1* | 2/2014 | Vasylyev ............. G02B 5/0205 |
| | | 359/593 |
| 2014/0104689 A1* | 4/2014 | Padiyath ............... G02B 5/0242 |
| | | 359/592 |
| 2014/0160785 A1* | 6/2014 | Tsai ........................ F21S 8/046 |
| | | 362/576 |
| 2014/0240839 A1 | 8/2014 | Yang et al. |
| 2015/0049387 A1* | 2/2015 | Kashiwagi ............ B29C 43/021 |
| | | 359/592 |
| 2018/0252968 A1* | 9/2018 | Nakamura ........ G02F 1/133606 |

FOREIGN PATENT DOCUMENTS

| | | |
|---|---|---|
| WO | WO 2016/064565 | 4/2016 |
| WO | WO 2016/064621 | 4/2016 |

OTHER PUBLICATIONS

Rubin, "Optical Properties of Soda Lime Silica Glasses," Solar Energy Materials, 1985, vol. 12, pp. 275-288.
Szu, "Fast Simulated Annealing," Physics Letters A, 1997, vol. 122, No. 3,4, pp. 157-162.
International Search Report for PCT International Application No. PCT/US2015/036395, dated Sep. 23, 2015, 3 pages.

* cited by examiner

OPTICAL STRUCTURES FOR REDIRECTING DAYLIGHT

CROSS REFERENCE TO RELATED APPLICATIONS

This application is a national stage filing under 35 U.S.C. 371 of PCT/US2015/036395, filed Jun. 18, 2015, which claims the benefit of U.S. Provisional Application No. 62/094,626, filed Dec. 19, 2014, the disclosures of which are incorporated by reference in their entireties herein.

BACKGROUND

Managing daylight in buildings requires attention to both architectural aesthetics and human factors. Metrics for daylight redirecting window glass enjoin these possibly competing design requirements. An illumination strategy for a given space incorporating daylight redirecting windows requires maximizing useful daylight available to observers located at multiple positions within the space, minimizing nuisance glare and/or illumination color imbalance, and in some embodiments maximizing the view through the glazing to the outside environment. One approach enabling the balance is to use partial coverage of the window glass by daylight redirecting optics. Partial coverage is usually achieved by full coverage of clerestory windows or region with daylight redirecting optics and no coverage on the rest of the window space.

SUMMARY

A first optical structure for redirecting daylight, consistent with the present invention, includes a base, at least two peaks, and sides extending between the base and the peaks where at least one of the sides is curved.

A second optical structure for redirecting daylight, consistent with the present invention, includes a base, at least two peaks, and sides extending between the base and the peaks where at least one of the sides is curved and the base has a surface diffuser.

A third optical structure for redirecting daylight, consistent with the present invention, includes a base, at least two peaks, sides extending between the base and the peaks where at least one of the sides is curved, and a material on a side of the base opposite the peaks where an interface between the material and the base forms a diffuser.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of this invention comprise a new form of window glass having sun-facing daylight redirecting optical structures with an embedded surface diffuser patterned on them. The embodiments include light redirecting structures, as described below, composed of generally linear unit cells each having a base, two or more peaks opposite the base, and at least one curved side between the base and the peaks. The other sides between the base and the peaks can be substantially straight, curved, or a series of facets approximating a curve.

The term "substantially straight" refers to a side that is mostly straight but that could deviate from a straight line due to inaccuracies introduced by manufacturing processes or may intentionally have minor curvature (i.e. large radius) to spread redirected light.

Examples of daylight redirecting optical structures and materials for such structures, including those described herein, are disclosed in U.S. Provisional Patent Application Ser. No. 62/066,302, entitled "Sun-Facing Light Redirecting Films with Reduced Glare," and filed Oct. 20, 2014, which is incorporated herein by reference as if fully set forth. Examples of daylight redirecting optical structures are also disclosed in U.S. Provisional Patent Application Ser. No. 62/094,626, entitled "Optical Structures for Redirecting Daylight," and filed Dec. 19, 2014, which is incorporated herein by reference as if fully set forth.

Description of the Claimed Optical Structure

Figure 1:
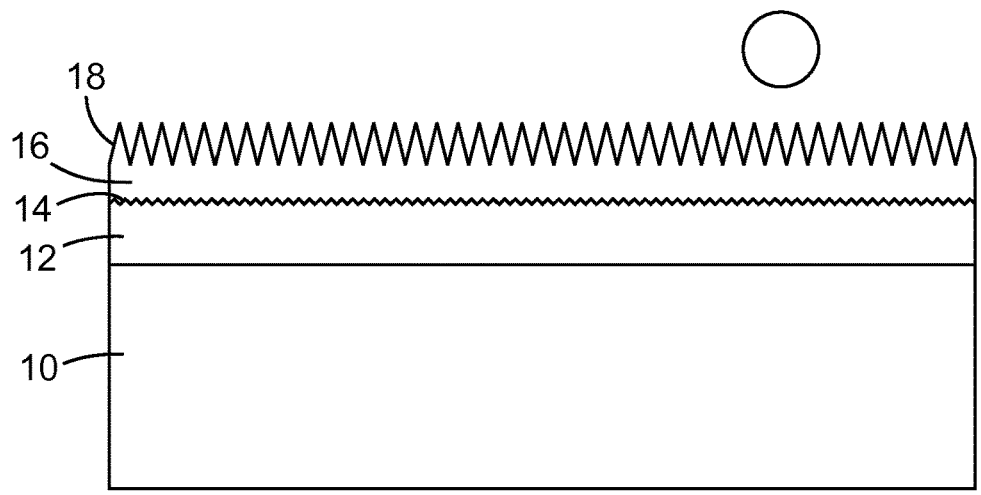
FIG. 1 is a diagram of a daylight redirecting optical structure with an embedded surface diffuser.

The patterned optical multi-layers disclosed here can include an embedded surface diffuser with daylight-redirecting structures as illustrated in FIG. 1. The composite article in FIG. 1 includes a substrate 10, a first material 12, an embedded surface diffuser 14, a second material 16, and a daylight redirecting optical structure 18. Substrate 10 can be implemented with, for example, glass or a flexible transparent film for attachment to glass windows.

Possible daylight redirecting structures include multi-peaked functions having sides that are substantially straight, curved, or faceted where faceted sides can approximate a curve. Curve types can include but are not limited to Bezier curves. The periodic structures can have one or more peaks per period. The number of peaks per period can be larger than two. The disclosed optical structures have been optimized for daylight redirecting using specific materials sets.

Desired Properties for Daylight Redirecting Glazing

Figure 2:
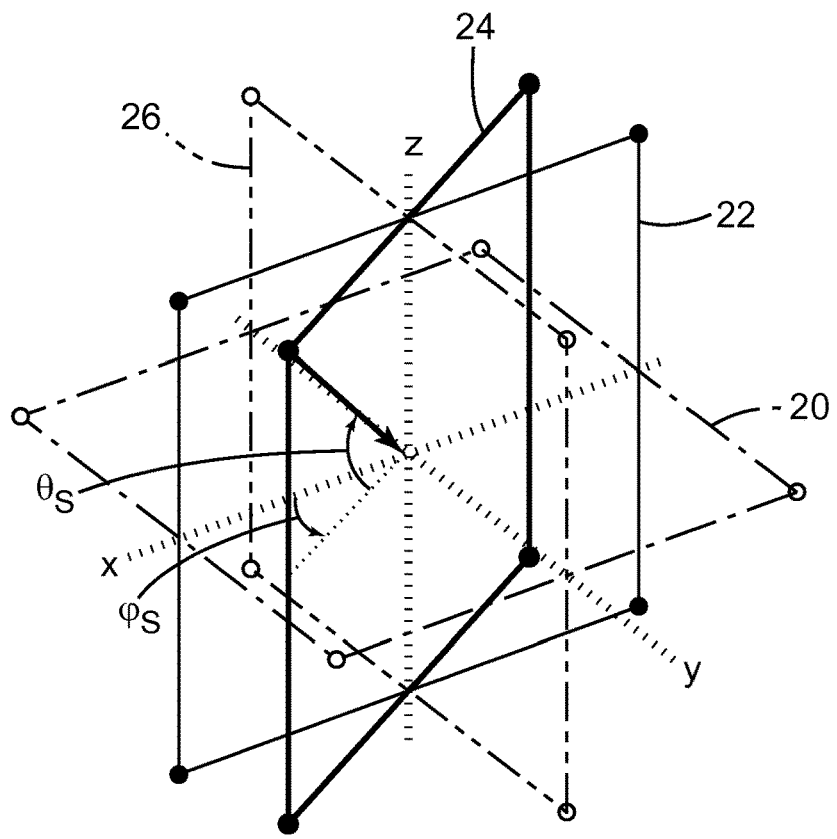
FIG. 2 illustrates reference planes for daylight redirecting optical structures.

It is assumed that combination glazing comprising regions covered and not covered by daylight redirecting optics is used to provide solar illumination for a space. For balancing available daylight in a space illuminated by daylight redirecting windows, sunlight incident on the glazing should be primarily redirected deep into the illuminated space where it would not be reached by the light transmitted directly by a flat window. The phrase "redirected primarily deep into the illuminated space" means redirected at angles slightly above the horizontal plane perpendicular to the incidence plane but not at angles close to the plane of the window. The latter angles would be light redirected directly primarily upwards and not outwards. FIG. 2 illustrates reference planes for this invention. The reference planes include a horizontal plane 20, a window plane 22, an incidence plane 24 with a solar elevation $\theta_s$ and azimuth $\varphi_s$, and a vertical plane 26.

For eliminating nuisance glare, sunlight should not be redirected immediately below the horizontal plane perpendicular to the incidence plane. For providing some light to viewers and/or work surfaces closer to the window some of the incident sunlight may be redirected at relatively steep angles below the horizontal plane perpendicular to the incidence plane.

Materials Measurements and Fits for the Examples

Refractive indices for the daylight-redirecting structure material (material 16 in FIG. 1) and embedded diffuser fill (material 12 in FIG. 1) were measured using a Metricon prism coupler (Metricon Corp., Pennington, N.J.) with three different lasers having three separate wavelengths (404, 532, and 632 nanometers for blue, green, and red ranges, respectively). Measured values for the refractive index of soda-lime window glass were taken from solar energy literature. For all three materials, a three term Laurent model as available in the LightTools product was fit to the measured values versus wavelength using linear least squares. The fitting algorithm for refractive index measurements was written using the MATLAB product.

The exemplary material measured for the daylight redirecting structures was SA-250P (Nagase & CO., LTD, Tokyo, Japan). The exemplary material for the embedded diffuser fill/adhesive was 2013 adhesive (Dow Corning, Midland, Mich.).

Embedded Surface Diffuser for Verification Modeling in the Examples

For the verification stage, an embedded diffuser structure was modeled using sunken hemispherical bumps patterned on a hexagonal lattice with close packing. The height of the portion of the sunken microspheres extending above the plane of the diffuser (bump height) was set to be 0.2975 times the radius of the microspheres. The RMS angle between the surface normal and the normal to the plane of the diffuser was calculated to be about 27.8 degrees. The Photopic haze for an optical stack with the daylight redirecting structure material patterned internally with the test embedded diffuser structure, filled with the embedded diffuser fill adhesive, and bonded to soda-lime glass was computed using ray tracing with the material models to be about 80%. General engineered diffuser surfaces that are random, pseudo-random, or deterministic may be used as the embedded diffuser.

Design Example 1—Two-Peak Daylight Redirecting Optic

Figure 3:
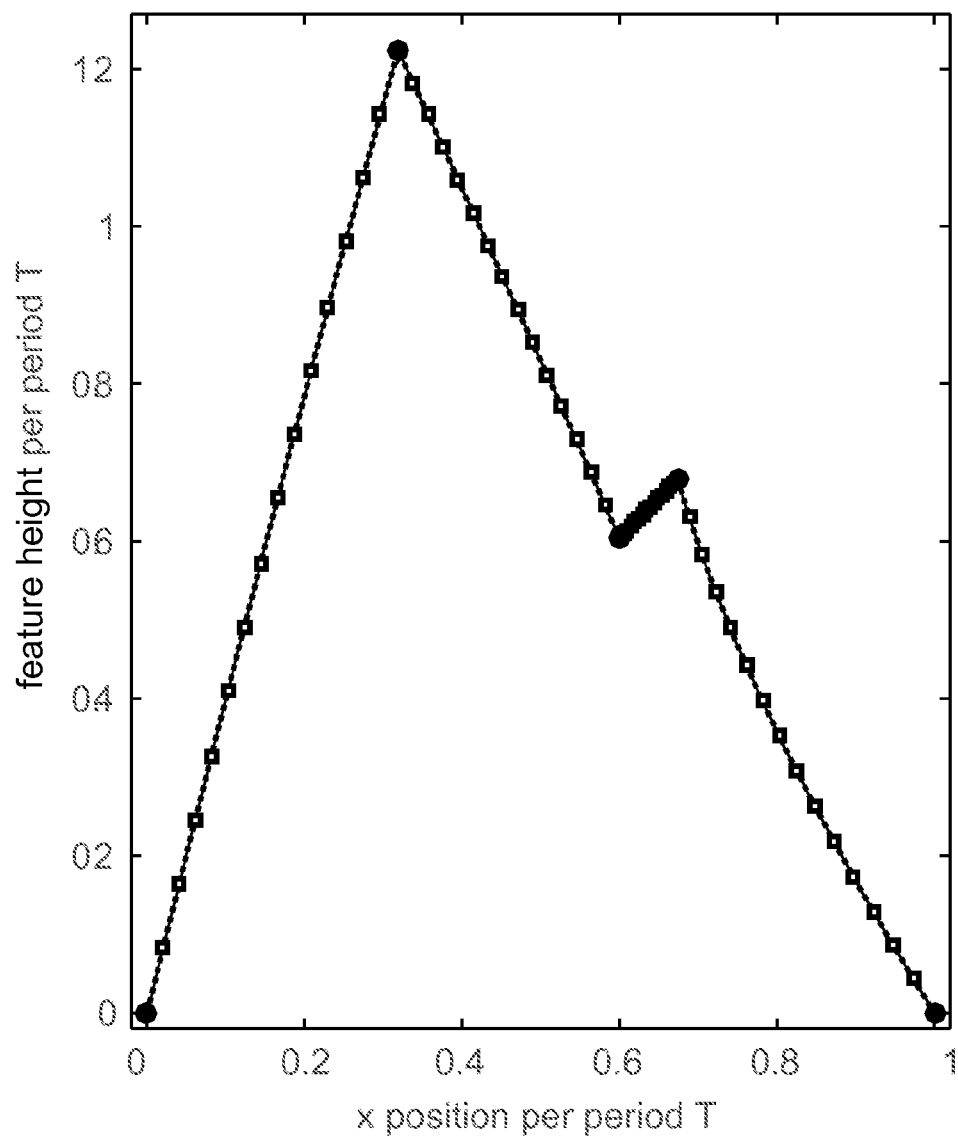
FIG. 3 is a side view of a two-peak design for optical structures.
Figure 4:
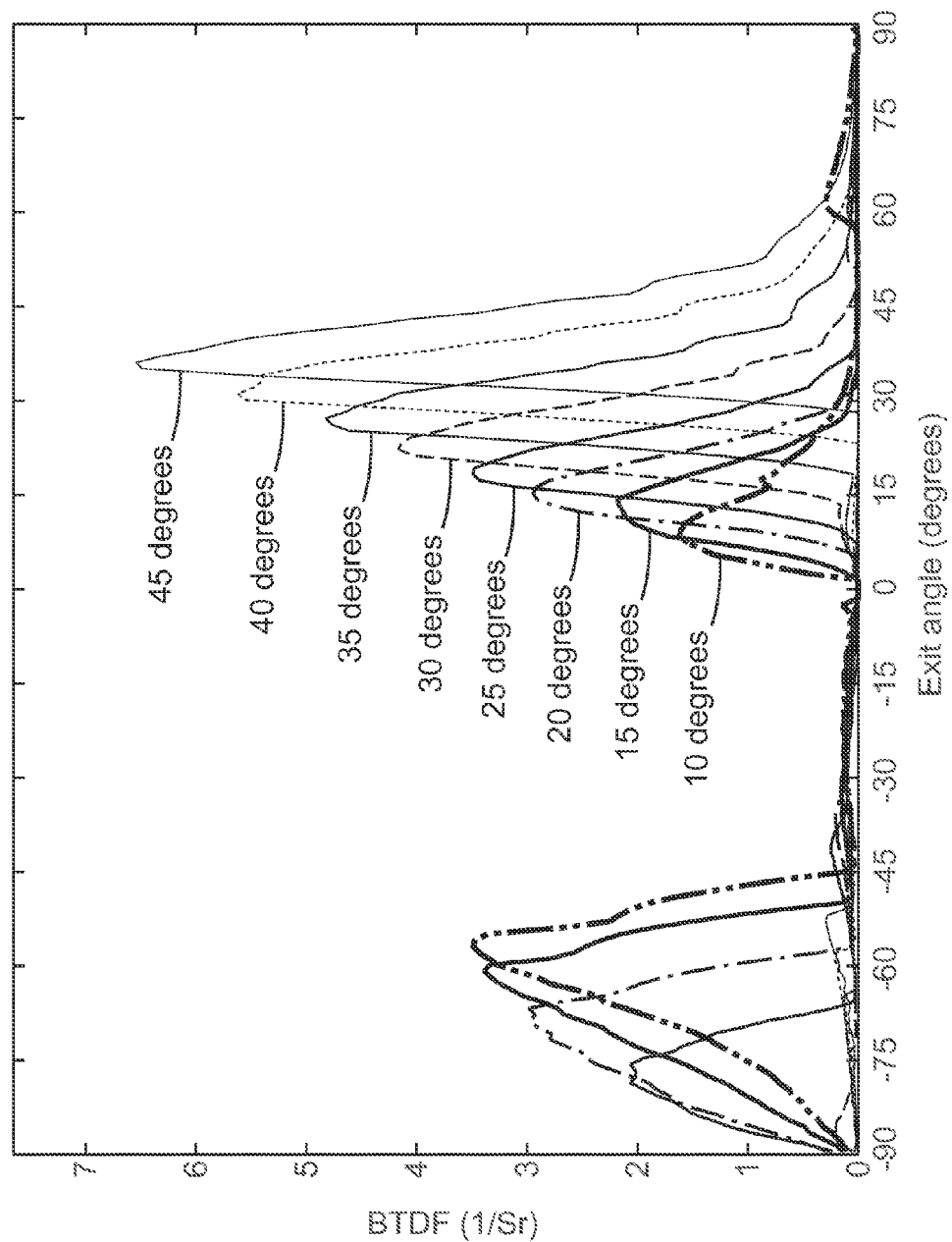
FIG. 4 is a graph of the transmission distribution function for the two-peak design of FIG. 3 from 10 degrees to 45 degrees.
Figure 5:
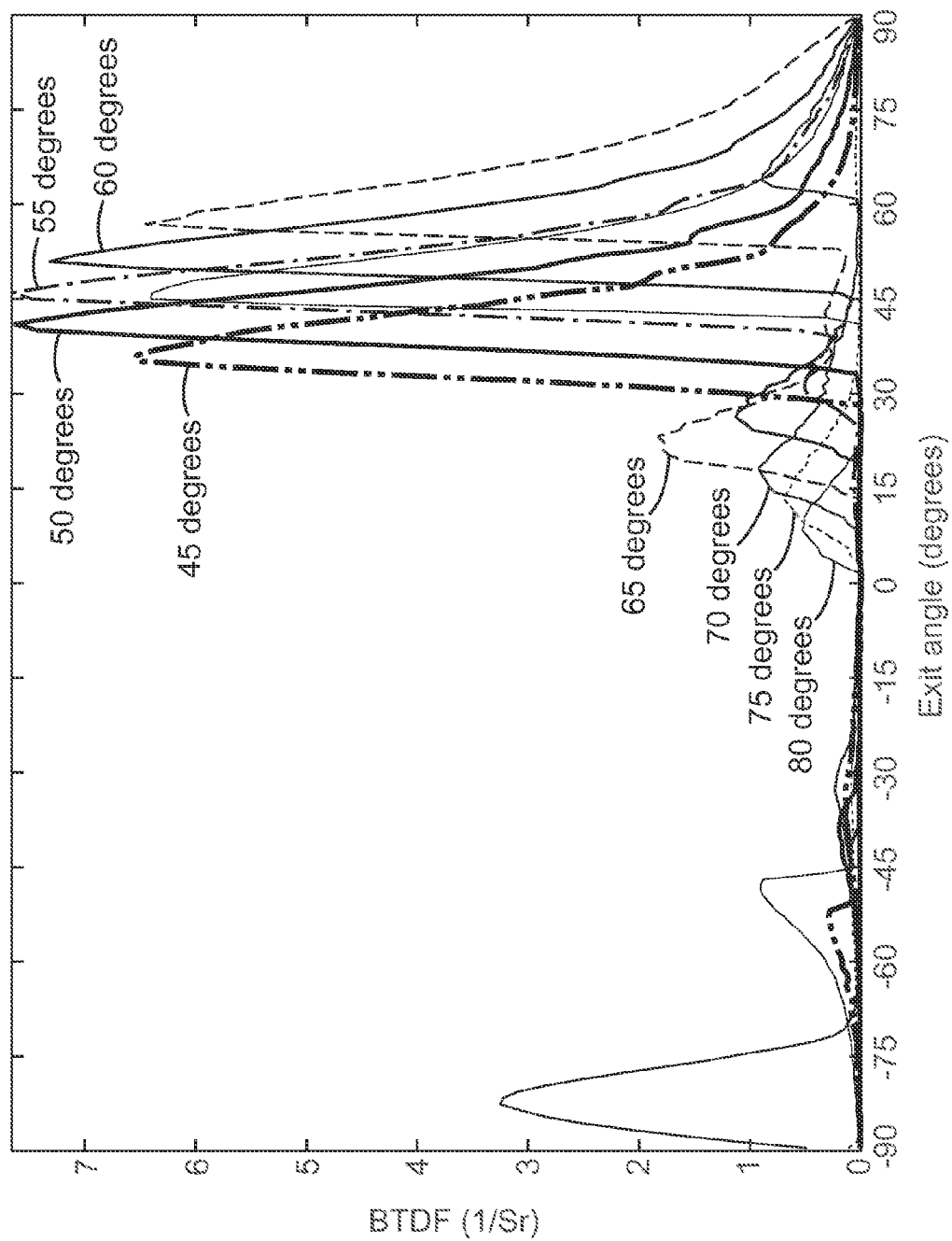
FIG. 5 is a graph of the transmission distribution function for the two-peak design of FIG. 3 from 45 degrees to 80 degrees.
Figure 6:
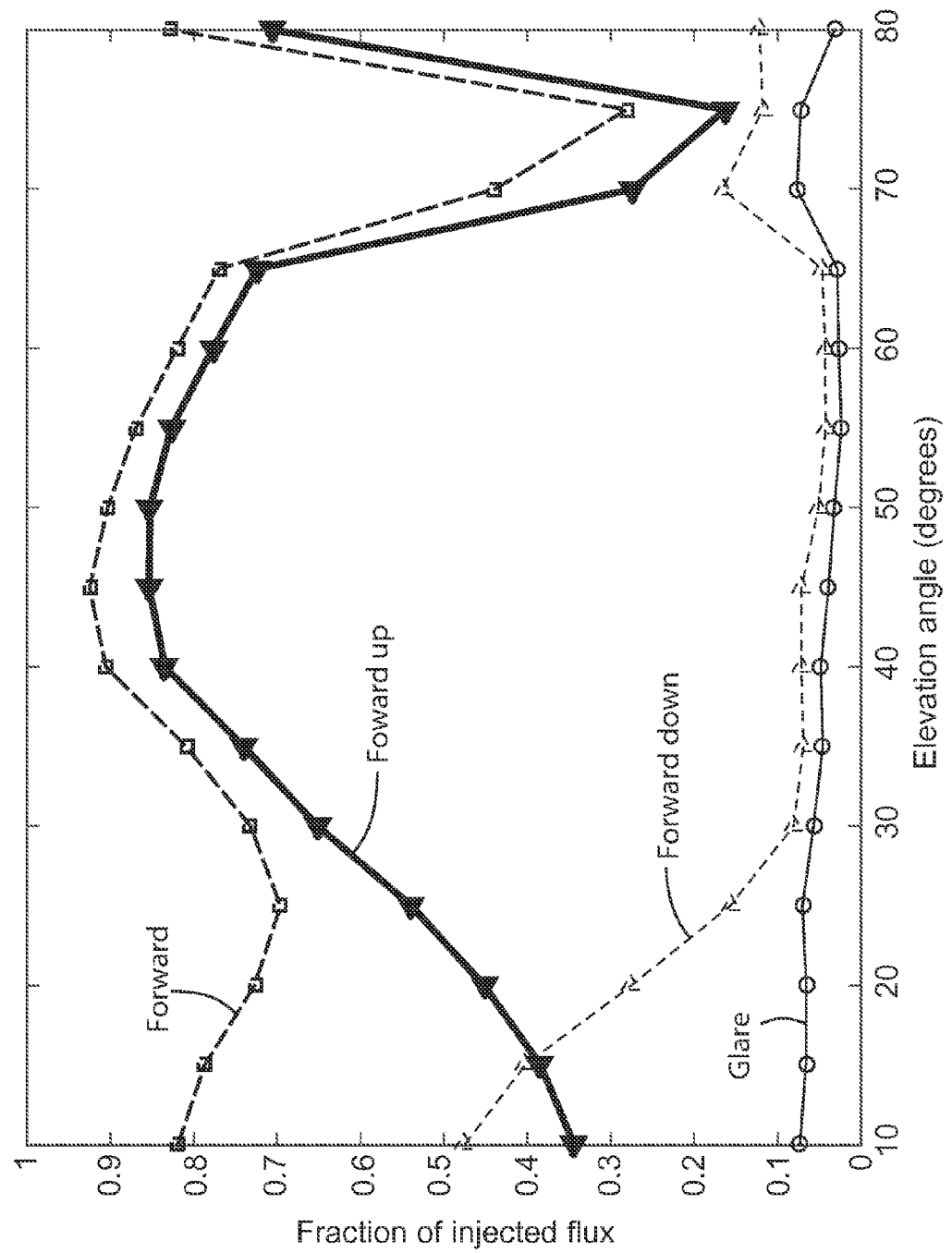
FIG. 6 is a graph of the glare, forward efficiency, and light redirected up and down for the two-peak design of FIG. 3.

A two-peak design was created for the example materials set. The design shape for one period of the function is illustrated in FIG. 3. The spatial dimensions for the shape as designed and illustrated in FIG. 3 are normalized by the pitch T. For verification the transmittance distribution function was computed for the two-peak design at 90 degree azimuth for a set of incidence elevations ranging from 10 degrees to 80 degrees in increments of 5 degrees. The transmittance distribution function in the vertical exit plane for the two-peak design is plotted for incident elevations from 10 degrees to 45 degrees in FIG. 4 and for incident elevations from 45 degrees to 80 degrees in FIG. 5. It is seen from FIGS. 4 and 5 that there is very little light transmitted in the formal glare range. The glare fraction, forward efficiency, and forward efficiencies for light redirected above and below (up and down) the horizontal plane versus incident elevation is plotted in FIG. 6. The glare fraction is below 0.1 for all incident elevations and the forward efficiency is greater than 0.7 for all incident elevations less than 70 degrees. The structure has a breakdown in forward efficiency at 70 degrees. The two-peak design has no significant color distortion until an incidence elevation of 80 degrees.

Design Example 2—Three-Peak Daylight Redirecting Optic

Figure 7:
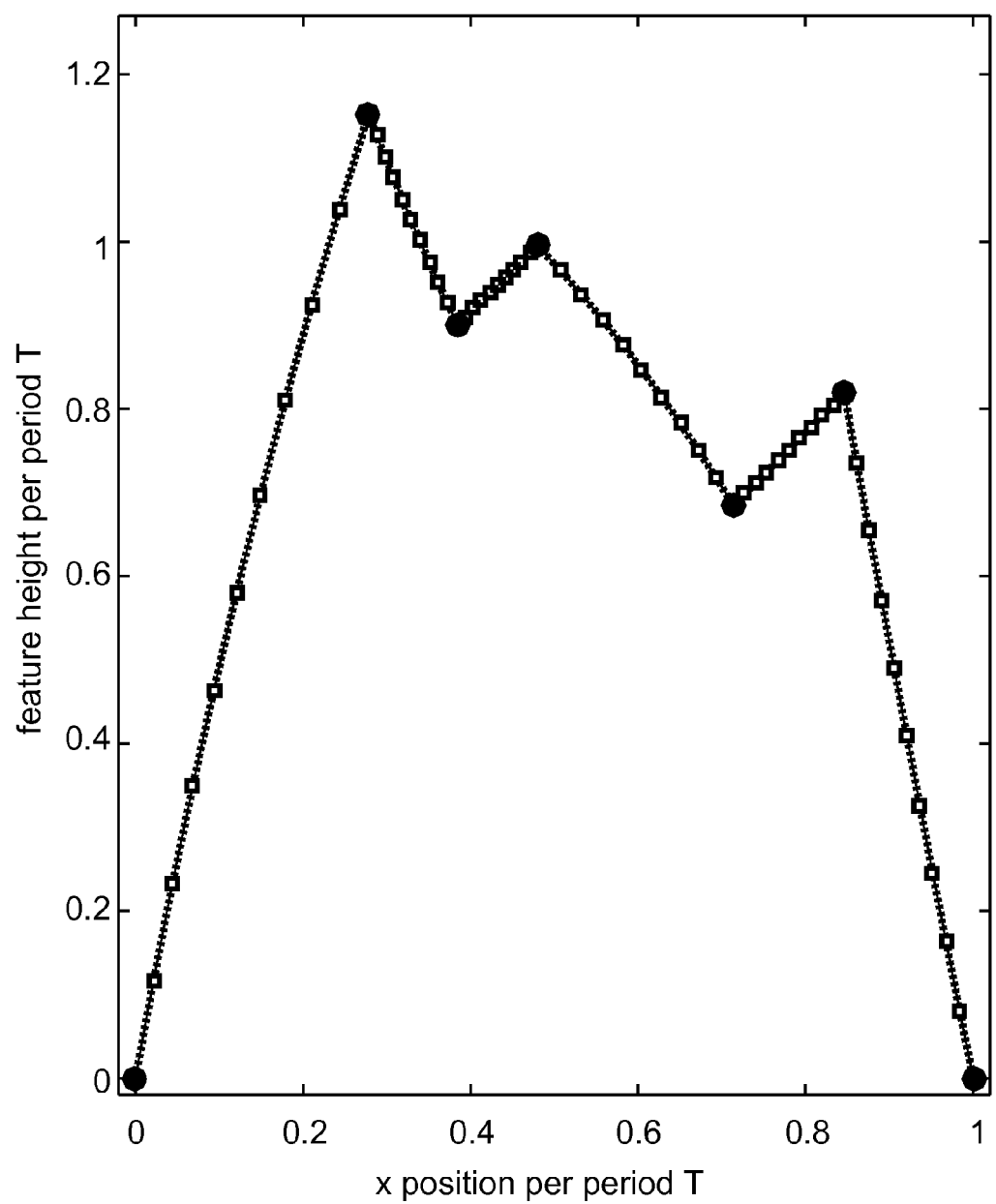
FIG. 7 is a side view of a three-peak design for optical structures.
Figure 8:
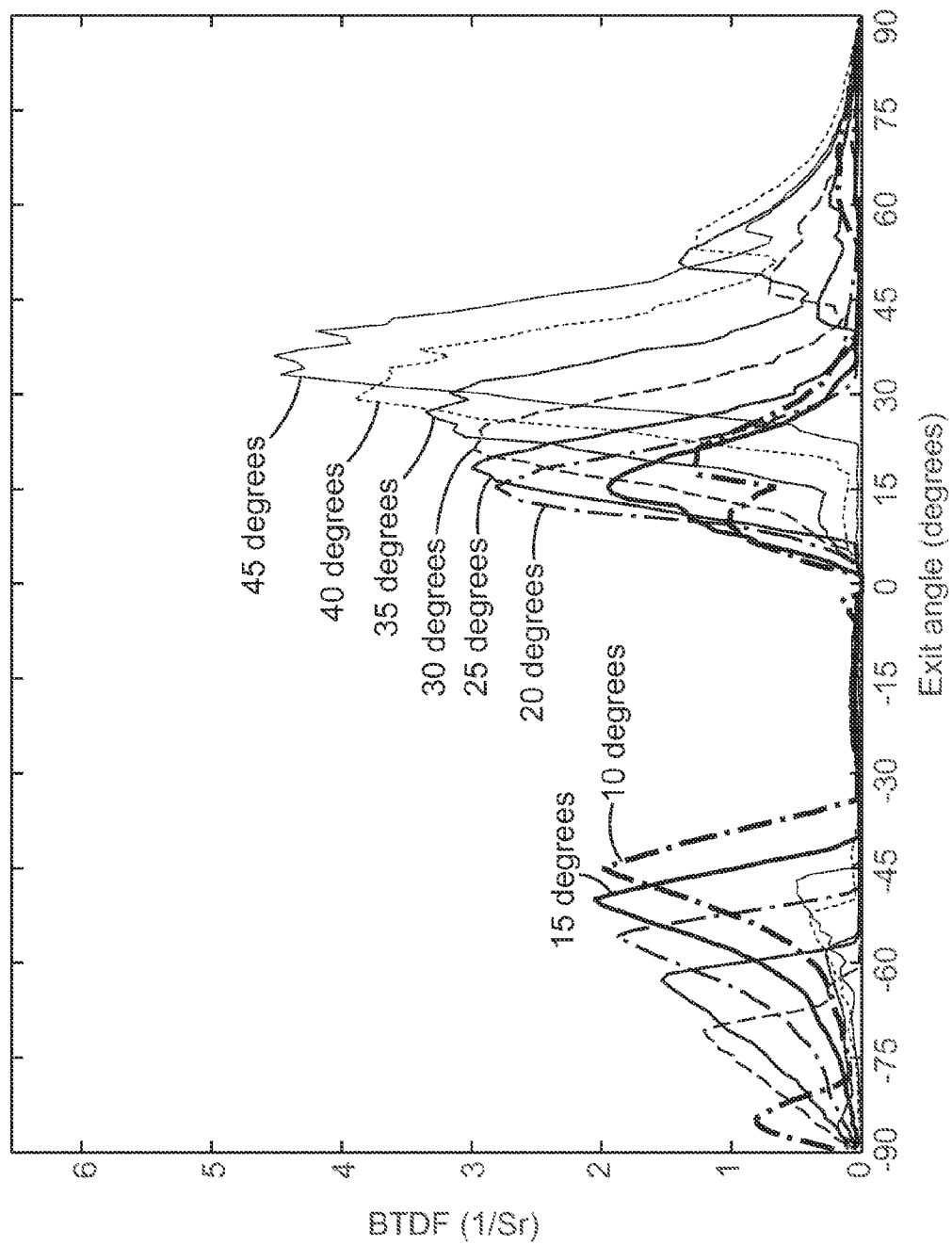
FIG. 8 is a graph of the transmission distribution function for the three-peak design of FIG. 7 from 10 degrees to 45 degrees.
Figure 9:
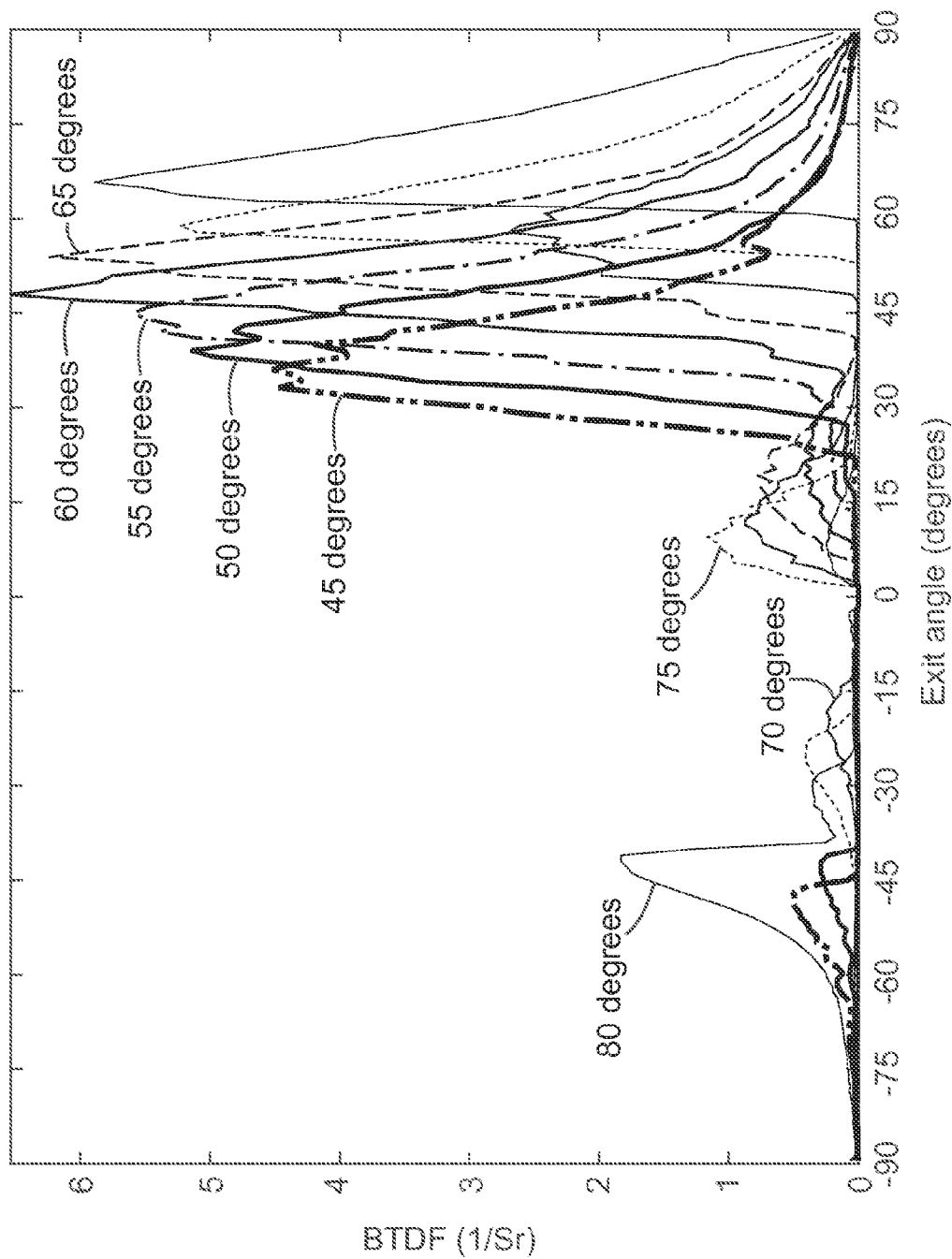
FIG. 9 is a graph of the transmission distribution function for the three-peak design of FIG. 7 from 45 degrees to 80 degrees.
Figure 10:
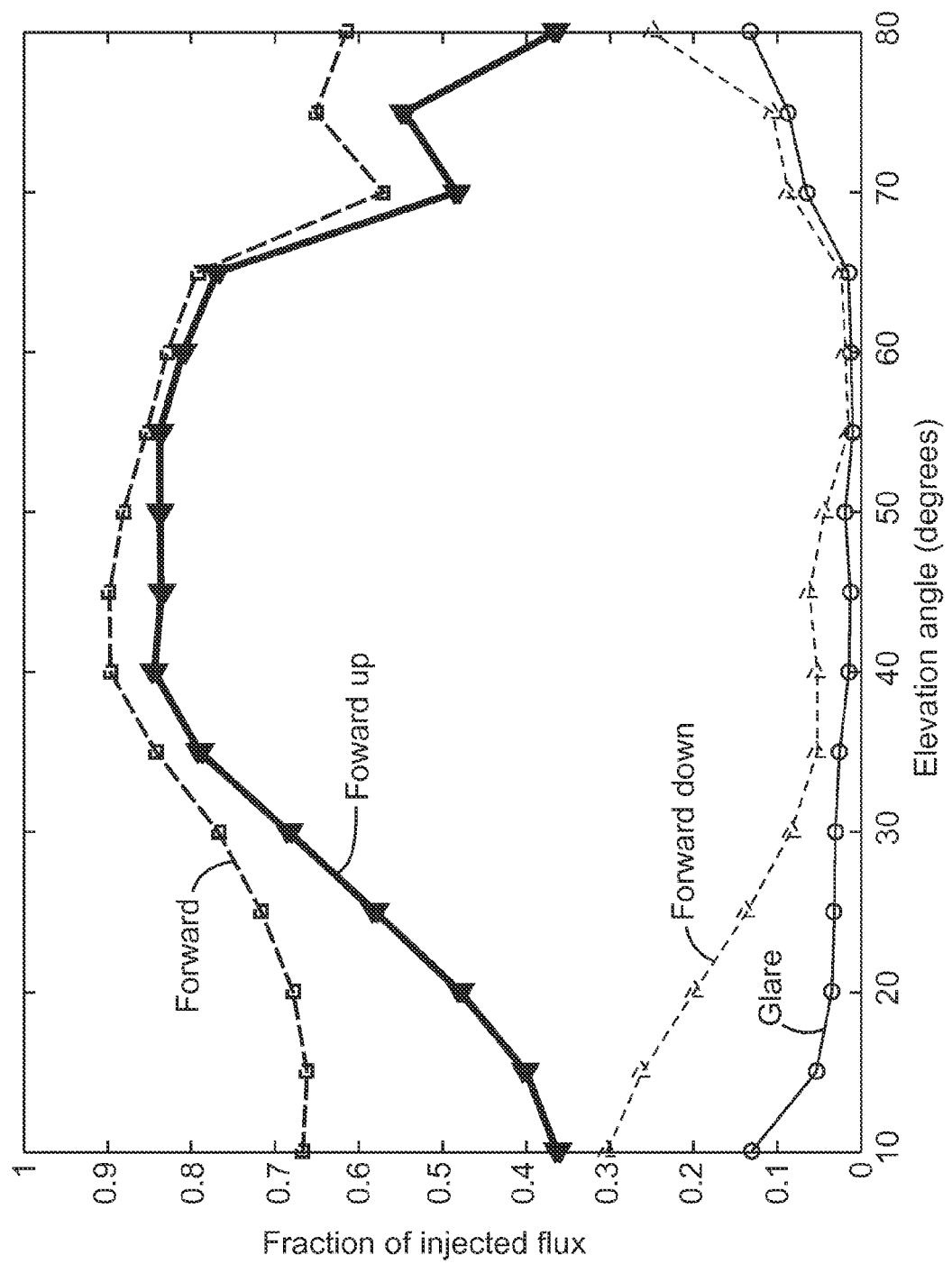
FIG. 10 is a graph of the glare, forward efficiency, and light redirected up and down for the three-peak design of FIG. 7.

A three-peak design was created for the example materials set, as illustrated in FIG. 7. As in the previous example, the spatial dimensions for the shape as designed and illustrated in are normalized by the pitch T. As in the previous example, for verification the transmittance distribution function was computed for the three-peak design at 90 degree azimuth for a set of incidence elevations ranging from 10 degrees to 80 degrees in increments of 5 degrees. The transmittance distribution function in the vertical exit plane for the three-peak design is plotted for incident elevations from 10 degrees to 45 degrees in FIG. 8 and for incident elevations from 45 degrees to 80 degrees in FIG. 9. It is seen from FIGS. 8 and 9 that there is very little light transmitted in the formal glare range for incident elevations between 15 degrees and 75 degrees but there is some glare in the lower and upper range of the elevations tested. The glare fraction, forward efficiency, and forward efficiencies for light redirected above and below (up and down) the horizontal plane versus incident elevation is plotted in FIG. 10. The glare fraction is below 0.1 for all incident elevations between 15 degrees and 75 degrees and the forward efficiency is greater than 0.65 for all incident elevations less than 70 degrees. The structure has a breakdown in forward efficiency at 70 degrees, but the breakdown is not nearly as severe as for the two-peak design as in the previous example.

The three-peak design has no significant color distortion until an incidence elevation of 80 degrees. The color distortion at 80 degrees is significantly lower than for the two-peak design and may be sufficiently white to be acceptable versus the obvious orange color at 80 degrees for the two-peak design arising from loss of blue light.

Design Example 3—Two-Peak Daylight Redirecting Optic

Figure 11:
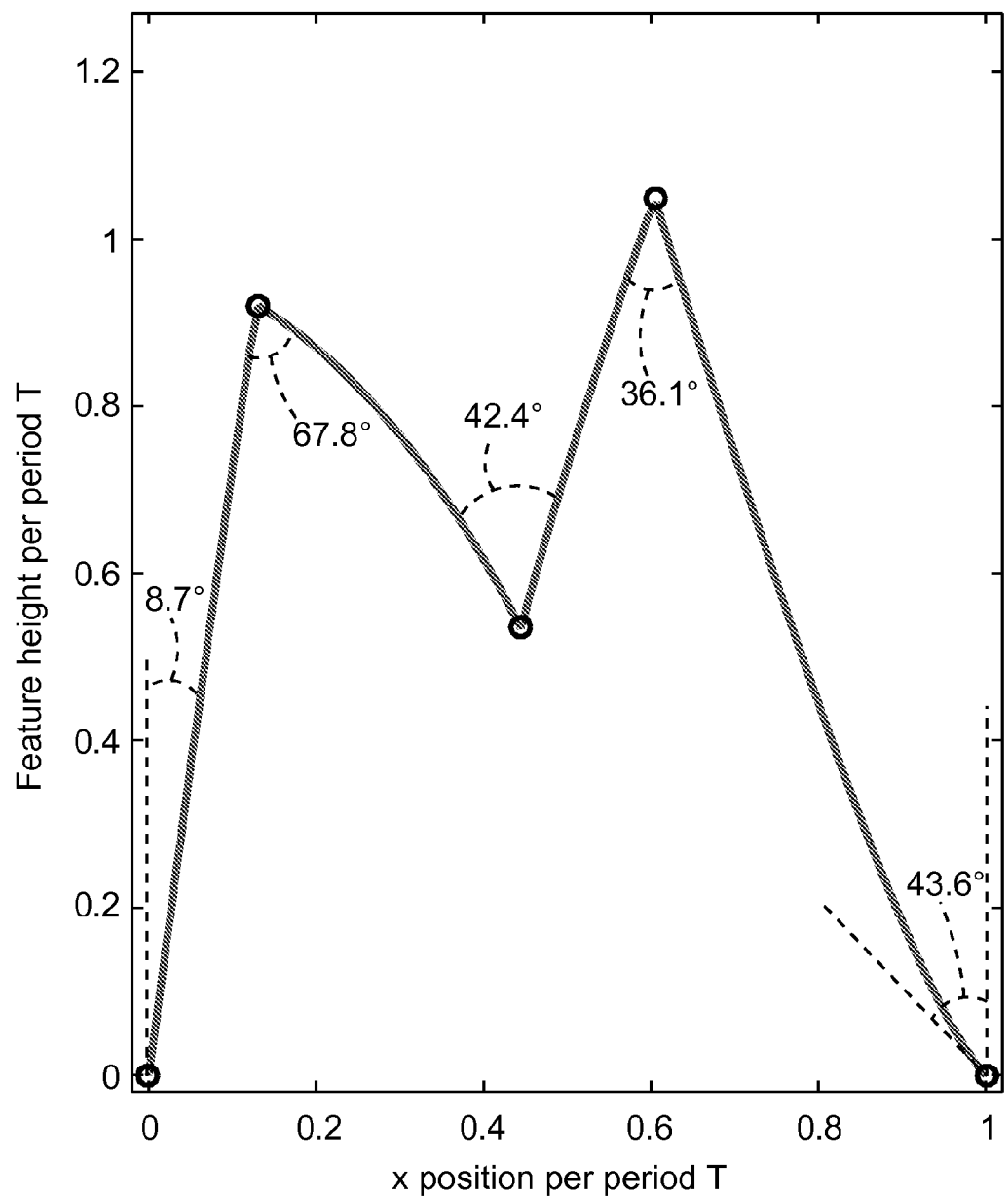
FIG. 11 is a side view of another two-peak design for optical structures.
Figure 12:
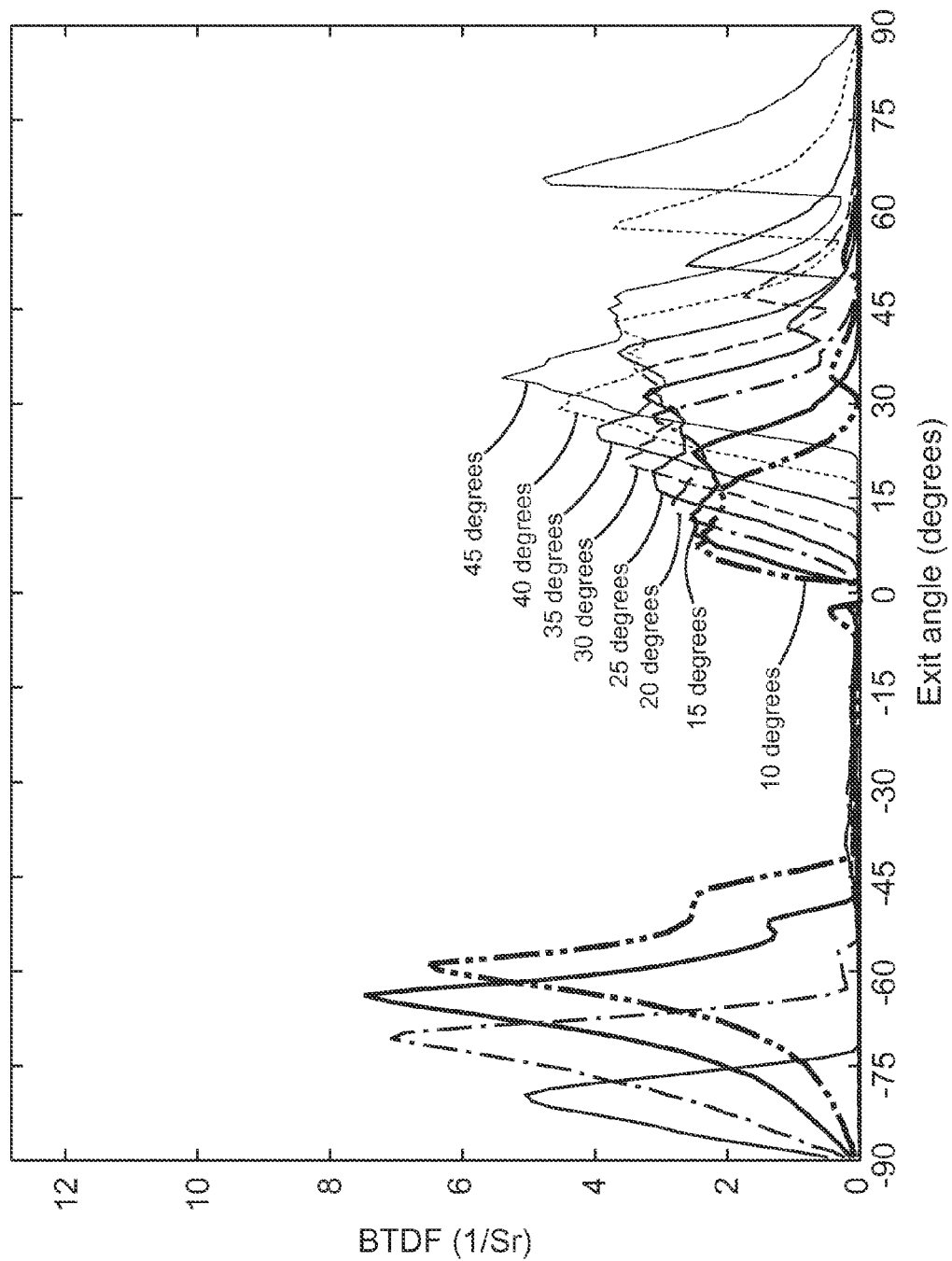
FIG. 12 is a graph of the transmission distribution function for the two-peak design of FIG. 11 from 10 degrees to 45 degrees.
Figure 13:
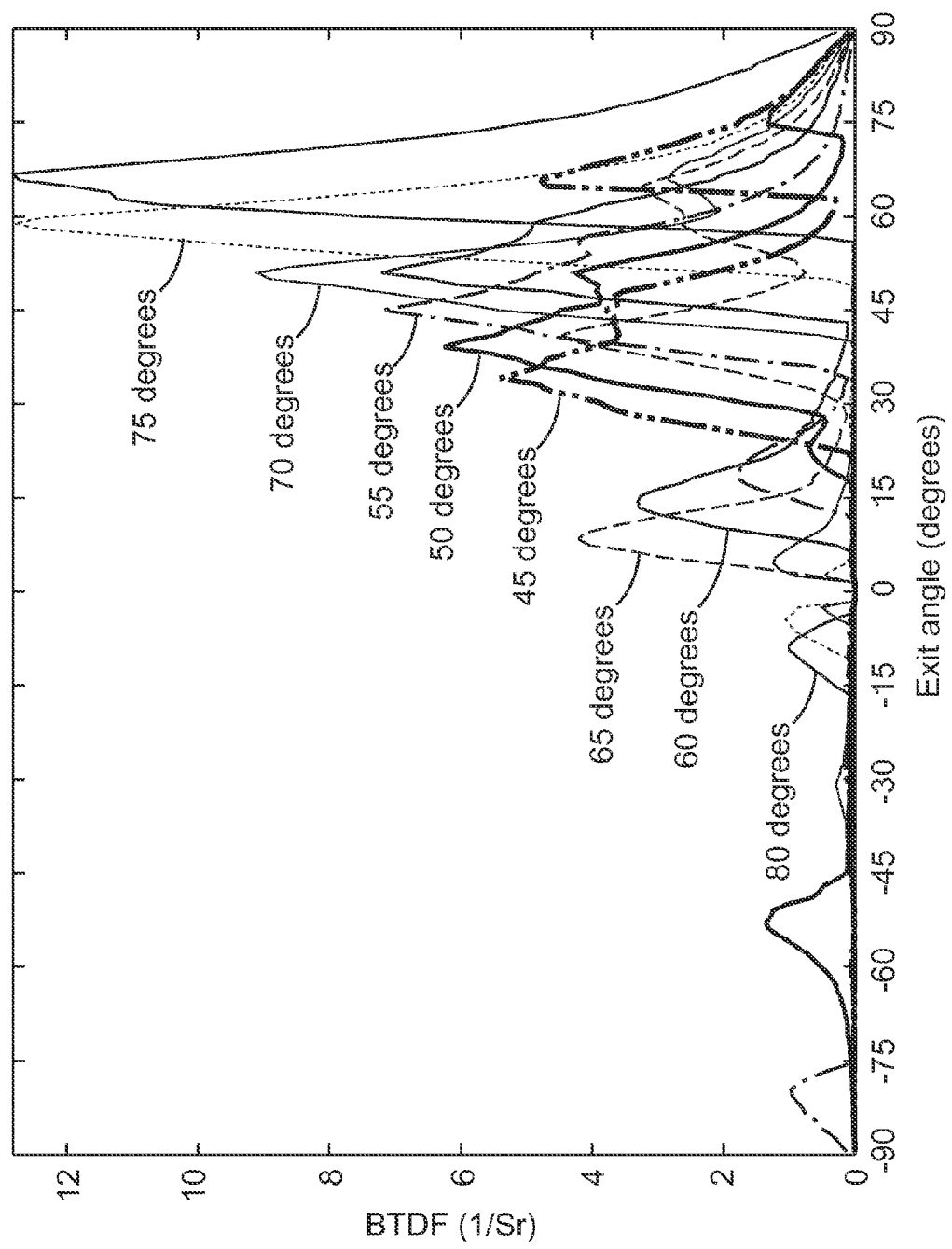
FIG. 13 is a graph of the transmission distribution function for the two-peak design of FIG. 11 from 45 degrees to 80 degrees.
Figure 14:
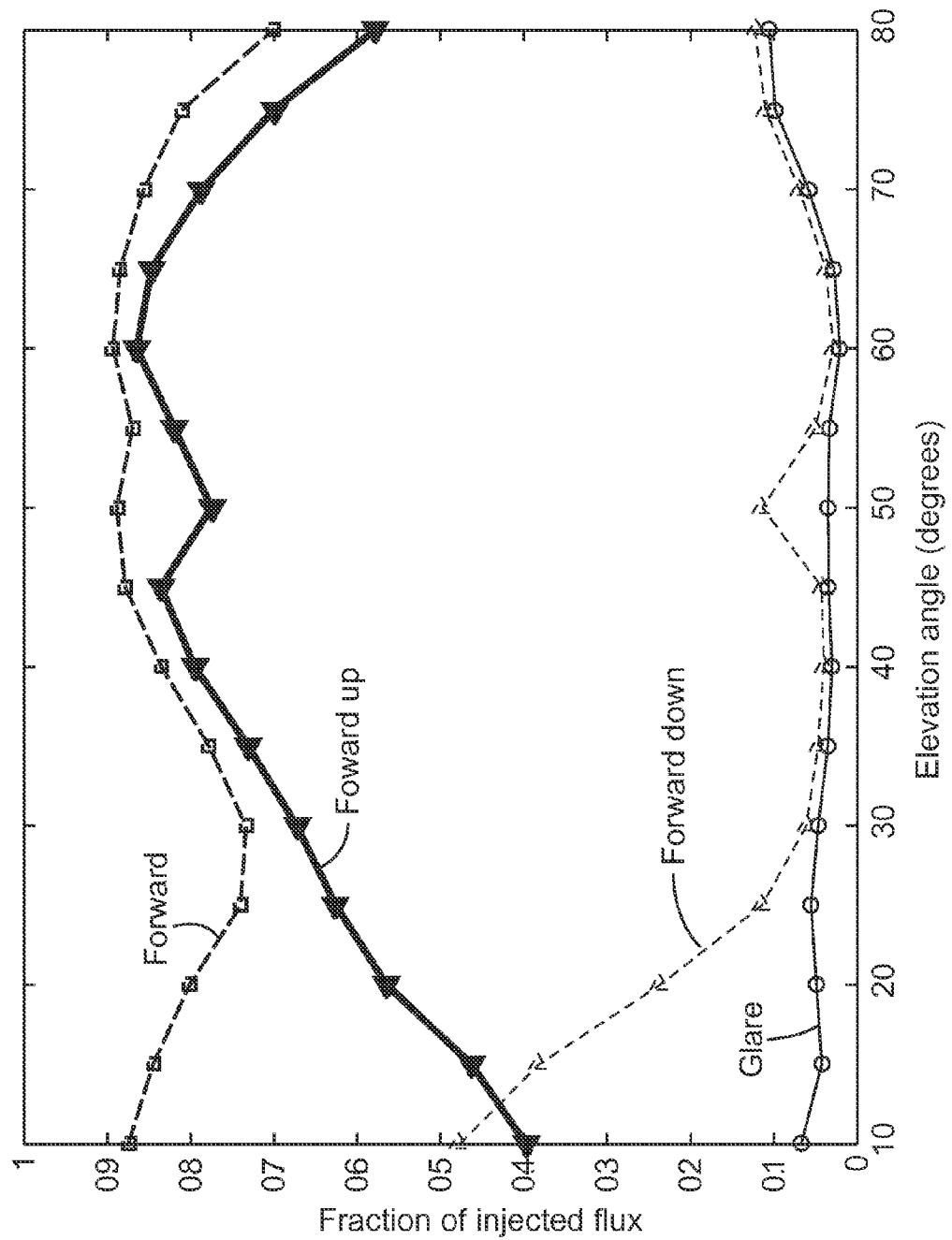
FIG. 14 is a graph of the glare, forward efficiency, and light redirected up and down for the two-peak design of FIG. 11.

Another two-peak design was created for the example materials set. The design shape for one period of the function is illustrated in FIG. 11. The spatial dimensions for the shape as designed and illustrated in FIG. 11 are normalized by the pitch T. For verification the transmittance distribution function was computed for the two-peak design at 90 degree azimuth for a set of incidence elevations ranging from 10 degrees to 80 degrees in increments of 5 degrees. The transmittance distribution function in the vertical exit plane for the two-peak design is plotted for incident elevations from 10 degrees to 45 degrees in FIG. 12 and for incident elevations from 45 degrees to 80 degrees in FIG. 13. It is seen from FIGS. 12 and 13 that there is very little light transmitted in the formal glare range. The glare fraction, forward efficiency, and forward efficiencies for light redirected above and below (up and down) the horizontal plane versus incident elevation is plotted in FIG. 14.

Exemplary Embodiments

Figure 15:
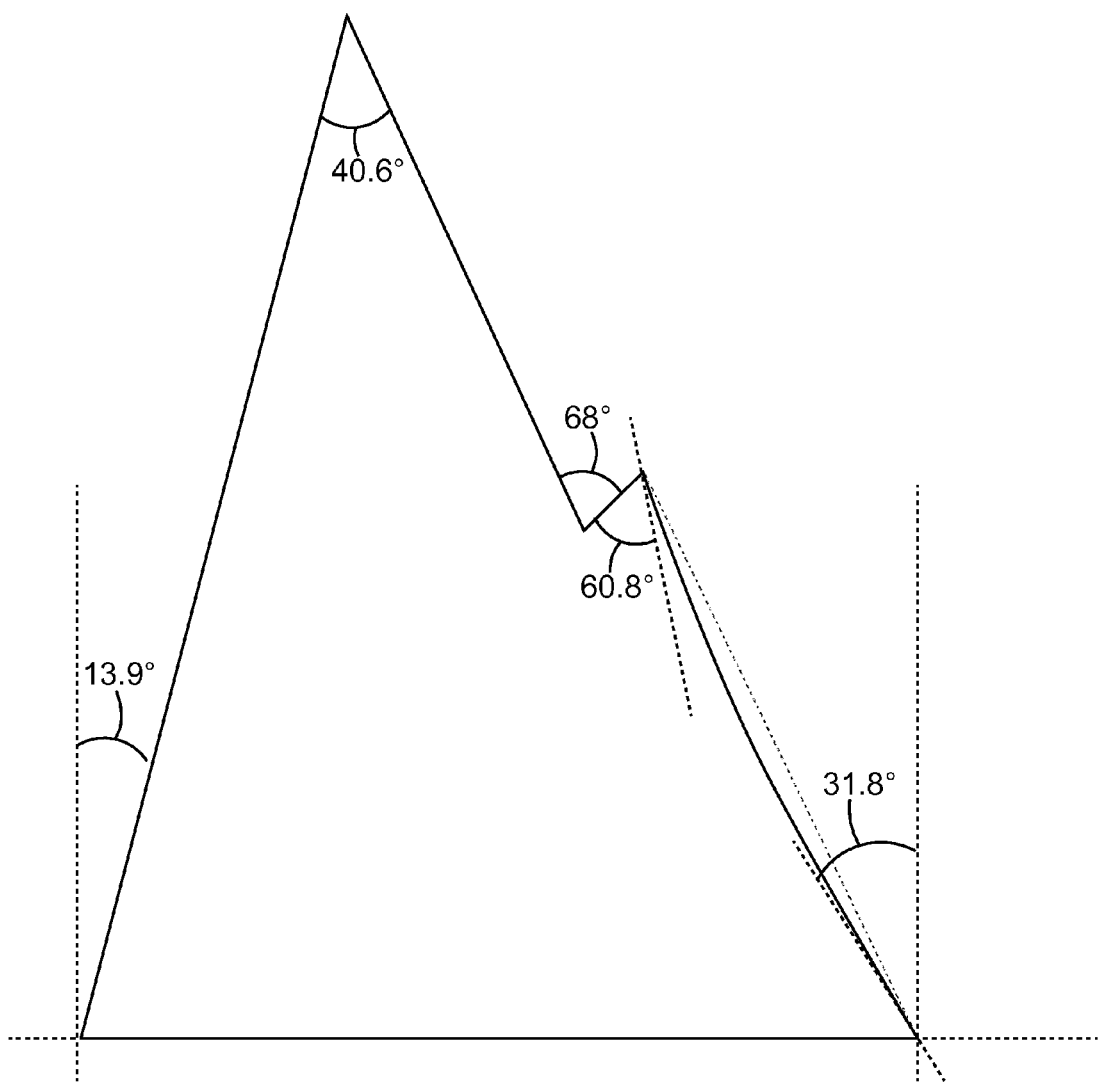
FIG. 15 illustrates angles of the light redirecting optical structure shown in FIG. 3.
Figure 16:
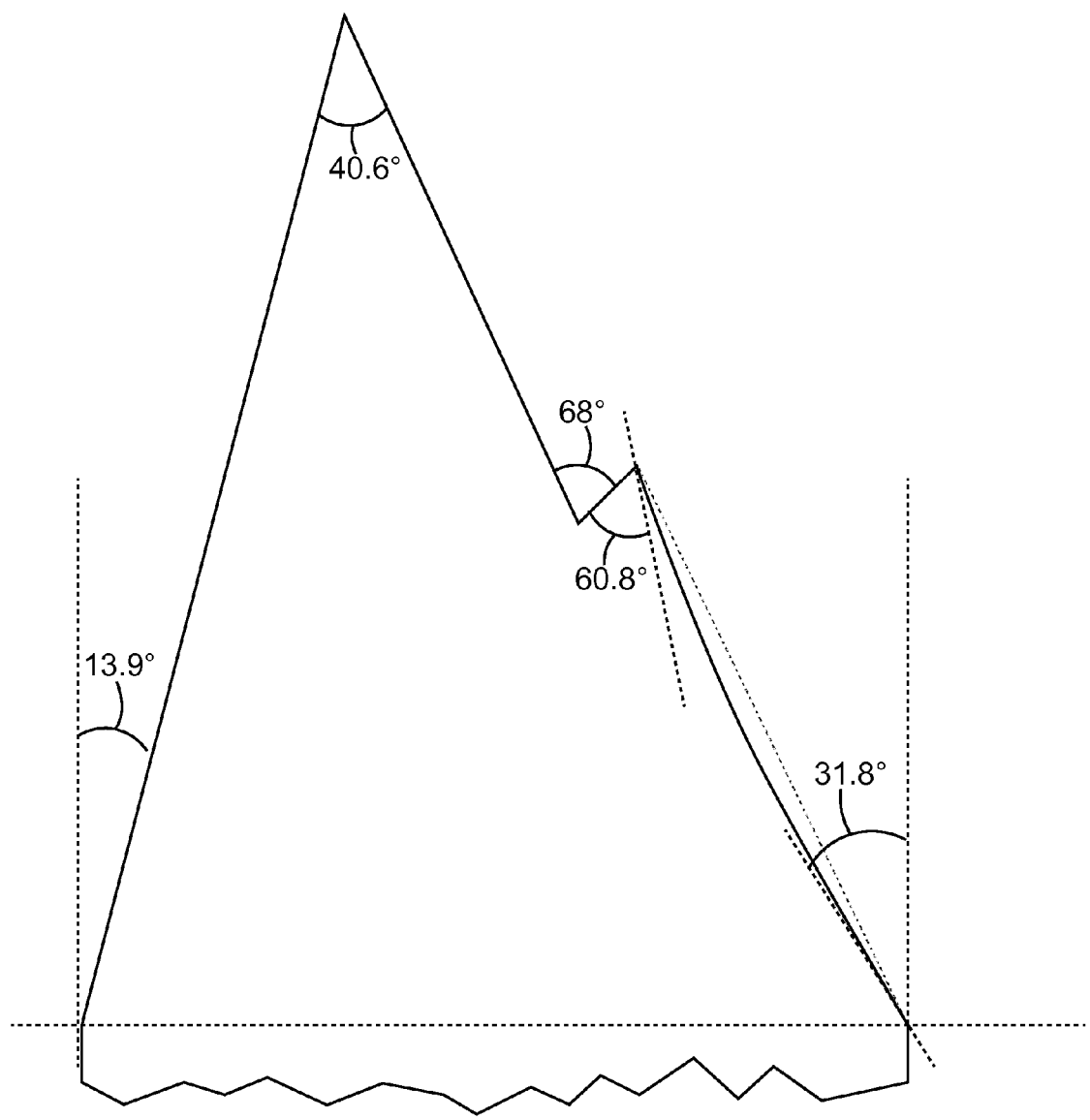
FIG. 16 illustrates the light redirecting optical structure shown in FIG. 3 with an integrated surface diffuser.
Figure 17:
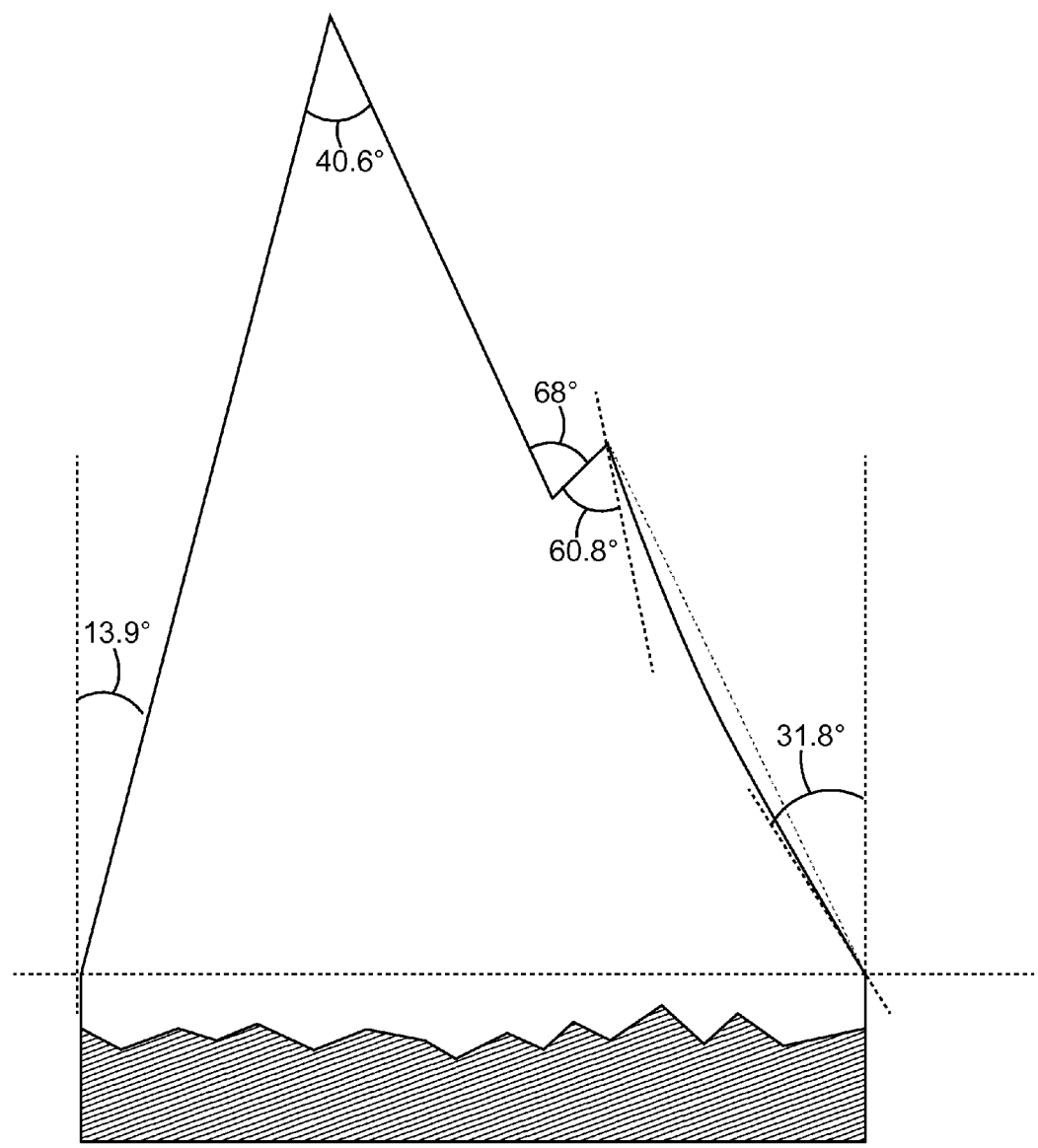
FIG. 17 illustrates the light redirecting optical structure shown in FIG. 3 with a diffuser at its base and a material on a side of the diffuser opposite the light redirecting structure.

FIG. 15 illustrates angles of a multi-peak unit cell corresponding with the light redirecting structure shown in FIG. 3. FIG. 16 illustrates the light redirecting structure shown in FIG. 3 with a diffuser, for example a roughened surface, at its base. FIG. 17 illustrates the light redirecting structure shown in FIG. 3 with a diffuser at its base and a material on a side of the diffuser opposite the light redirecting structure, where the material has a different index of refraction from the material of light redirecting structure.

The unit cells shown in FIGS. 15-17, and in FIGS. 7 and 11, can be repeated across a window or discreet regions of it with the features facing the sun in order to redirect daylight through the window, as illustrated in FIG. 1. These structures are generally linear, and the unit cells are cross-sectional views of the structures.

The optical structures described herein can have a radius of curvature per pitch for at least one point on the side of less than 1.0, or less than 2.0, or less than 5.0, or less than 10.0, or less than 20.0.

The following are exemplary materials that can be used as backfills with the optical structures: a cured silsesquioxane comprised of SSQ 60% phenyl 40% vinyl and a polysiloxane copolymer HSi(MeHSi—O)(PhMeSi—O)SiH (Gelest HPM-502, 75-110 cst); a cured silsesquioxane system comprised of SSQ 70% phenyl 20% isobutyl 10% vinyl and a polysiloxane copolymer HSi(MeHSi—O)(PhMeSi—O)SiH (Gelest HPM-502, 75-110 cst); and accrued silsesquioxane system comprised of SSQ 80% methyl 20% vinyl, an SiH terminated PDMS (Gelest DMS-H03 2-3 cst) and a PDMS surface treated zirconia. A siloxane polyoxamide material can be used as an adhesive with the optical structures.

The invention claimed is:

1. A daylight redirecting film, comprising:
a substrate;
a repeating unit cell on the substrate, the repeating unit cell comprising an optical structure, the optical structure for redirecting daylight when the daylight redirecting film is attached to a sun-facing window, comprising:
a base;
a linear structure wherein the linear structure is multi-peaked having three cross-sectional peaks; and
sides extending between the base and the peaks of the linear structure, wherein at least one of the sides is curved,
wherein each of the three cross-sectional peaks has a different height from the base from the other two peaks.

2. The optical structure of claim 1, wherein another one of the sides is substantially straight.

3. The optical structure of claim 1, wherein another one of the sides comprises a series of facets approximating a curve.

4. The daylight redirecting film of claim 1, further comprising a material on a side of the base opposite the peaks, wherein an interface between the material and the base forms a diffuser.

5. The daylight redirecting film of claim 4, wherein the material has a different index of refraction from the base.

6. The daylight redirecting film of claim 1, wherein two of the sides are curved.

7. A glazing unit comprising:
a glazing; and
a daylight redirecting film attached to the glazing, the daylight redirecting film comprising:
a substrate; and
a repeating unit cell on the substrate, the repeating unit cell comprising an optical structure, comprising:
a base;
a linear structure wherein the linear structure is multi-peaked having three cross-sectional peaks; and
sides extending between the base and the peaks of the linear structure,
wherein at least one of the sides is curved, and
wherein each of the three cross-sectional peaks has a different height from the base from the other two peaks,
wherein the optical structure redirects daylight when the daylight redirecting film is attached to a sun-facing glazing.

8. The glazing unit of claim 7, wherein another one of the sides of the optical structure is substantially straight.

9. The glazing unit of claim 7, wherein another one of the sides of the optical structure comprises a series of facets approximating a curve.

10. The glazing unit of claim 7, further comprising a material on a side of the base opposite the peaks, wherein an interface between the material and the base forms a diffuser.

11. The glazing unit of claim 10, wherein the material has a different index of refraction from the base.

12. The glazing unit of claim 7, wherein two of the sides of the optical structure are curved.

* * * * *